US010223754B1

(12) United States Patent
Lopez et al.

(10) Patent No.: US 10,223,754 B1
(45) Date of Patent: Mar. 5, 2019

(54) PERSONAL FINANCIAL PLANNING AND ENGAGEMENT WITH PEER-BASED COMPARISON

(71) Applicant: Wells Fargo Bank, N.A., San Francisco, CA (US)

(72) Inventors: Gilberto Lopez, Palo Alto, CA (US); Leslie Rae Witt, Mountain View, CA (US); Jeff D. Street, San Rafael, CA (US); Nancy S. Middleton, Sugar Land, TX (US); Evan Siegel, Palo Alto, CA (US); Brittany Harris, Oakland, CA (US); Nonna A. Pastore, Morago, CA (US); Ben Soccorsy, Larkspur, CA (US); Todd Lawrence Denbo, Larkspur, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 14/734,711

(22) Filed: Jun. 9, 2015

Related U.S. Application Data

(60) Provisional application No. 62/036,380, filed on Aug. 12, 2014.

(51) Int. Cl.
G06Q 40/02 (2012.01)
G06Q 40/00 (2012.01)
G06Q 50/00 (2012.01)

(52) U.S. Cl.
CPC ............. *G06Q 40/12* (2013.12); *G06Q 50/01* (2013.01)

(58) Field of Classification Search
CPC ............................... G06Q 40/02; G06Q 40/06

USPC .................................................. 705/35, 36 R
See application file for complete search history.

(56) References Cited

U.S. PATENT DOCUMENTS

| | | |
|---|---|---|
| 6,792,422 B1 | 9/2004 | Stride et al. |
| 7,565,139 B2 | 7/2009 | Neven et al. |
| 7,603,382 B2 | 10/2009 | Halt, Jr. |
| 7,641,124 B2 | 1/2010 | Brown et al. |
| 7,895,102 B1 * | 2/2011 | Wilks ..................... G06Q 30/06 235/379 |
| 7,966,329 B1 | 6/2011 | Rukonic et al. |
| 8,083,137 B2 | 12/2011 | Tannenbaum |

(Continued)

OTHER PUBLICATIONS

U.S. Appl. No. 14/090,229, filed Nov. 26, 2013, Wells Fargo Bank, N.A.

(Continued)

*Primary Examiner* — Oluseye Iwarere
(74) *Attorney, Agent, or Firm* — Foley & Lardner LLP

(57) ABSTRACT

A computer-implemented method for setting and tracking financial goals includes retrieving account information associated with a financial account of a user. The method also includes providing to the user via a user interface, prospective financial goals. The method further includes receiving from the user via the user interface, a selection of one of the financial goals. Further yet, the method includes monitoring the user's account information to track the user's progress towards the selected financial goal. In addition, the method includes providing to the user via the user interface, based on the monitoring of the user's account information, no more than three suggested actions to improve the user's progress towards the selected financial goal.

34 Claims, 8 Drawing Sheets

(56) References Cited

U.S. PATENT DOCUMENTS

| | | | |
|---|---|---|---|
| 8,160,941 B1* | 4/2012 | Field | G06Q 10/10 705/30 |
| 8,421,872 B2 | 4/2013 | Neven, Sr. | |
| 8,498,909 B1 | 7/2013 | Keld | |
| 8,538,827 B1 | 9/2013 | Dryer et al. | |
| 8,620,780 B2 | 12/2013 | Krakowiecki et al. | |
| 8,639,621 B1 | 1/2014 | Ellis et al. | |
| 8,639,622 B1* | 1/2014 | Moore | G06Q 40/00 705/35 |
| 8,719,132 B1* | 5/2014 | Diggdon | G06Q 40/00 705/35 |
| 9,721,282 B2 | 8/2017 | Hitchcock et al. | |
| 9,727,910 B1 | 8/2017 | Wu | |
| 2001/0047307 A1 | 11/2001 | Bennett et al. | |
| 2002/0116245 A1 | 8/2002 | Hinkle et al. | |
| 2003/0149647 A1 | 8/2003 | Youngblood, Jr. | |
| 2005/0027632 A1* | 2/2005 | Zeitoun | G06Q 40/06 705/36 R |
| 2005/0149437 A1 | 7/2005 | Zellner et al. | |
| 2006/0047971 A1 | 3/2006 | Miyazaki et al. | |
| 2006/0069619 A1* | 3/2006 | Walker | G06Q 30/02 705/14.25 |
| 2008/0010193 A1 | 1/2008 | Rackley, III et al. | |
| 2008/0088628 A1 | 4/2008 | Lu et al. | |
| 2009/0204539 A1* | 8/2009 | Parker | G06Q 20/105 705/41 |
| 2010/0057574 A1 | 3/2010 | Banerjee et al. | |
| 2010/0075638 A1 | 3/2010 | Carlson et al. | |
| 2011/0130197 A1 | 6/2011 | Bytnar et al. | |
| 2011/0173041 A1 | 7/2011 | Breitenbach et al. | |
| 2011/0208588 A1 | 8/2011 | Joa et al. | |
| 2011/0279242 A1 | 11/2011 | Krawczewicz | |
| 2011/0320325 A1 | 12/2011 | Preston et al. | |
| 2012/0083705 A1* | 4/2012 | Yuen | A61B 5/0002 600/508 |
| 2012/0158557 A1 | 6/2012 | Minzner et al. | |
| 2012/0179548 A1 | 7/2012 | Sun et al. | |
| 2012/0215668 A1 | 8/2012 | Krakowiecki et al. | |
| 2012/0290449 A1 | 11/2012 | Mullen et al. | |
| 2012/0296768 A1* | 11/2012 | Fremont-Smith | G06Q 40/02 705/26.8 |
| 2012/0330830 A1 | 12/2012 | Mason et al. | |
| 2013/0018778 A1 | 1/2013 | Bohanan et al. | |
| 2013/0018792 A1 | 1/2013 | Casey et al. | |
| 2013/0030994 A1 | 1/2013 | Calman et al. | |
| 2013/0046620 A1 | 2/2013 | Pahls et al. | |
| 2013/0046702 A1* | 2/2013 | Ross | G06Q 30/0201 705/319 |
| 2013/0085919 A1* | 4/2013 | Keld | G06Q 10/10 705/35 |
| 2013/0159195 A1 | 6/2013 | Kirillin et al. | |
| 2013/0282573 A1 | 10/2013 | Mullen et al. | |
| 2013/0297400 A1 | 11/2013 | Nagarajan et al. | |
| 2013/0325946 A1* | 12/2013 | Allison, Jr. | G06Q 50/01 709/204 |
| 2014/0006114 A1 | 1/2014 | Nuzzi et al. | |
| 2014/0006272 A1 | 1/2014 | Calman et al. | |
| 2014/0012683 A1 | 1/2014 | Patel et al. | |
| 2014/0012704 A1 | 1/2014 | Mizhen et al. | |
| 2014/0046816 A1 | 2/2014 | Avari et al. | |
| 2014/0047331 A1 | 2/2014 | Feldman et al. | |
| 2014/0057610 A1 | 2/2014 | Olincy et al. | |
| 2014/0067634 A1* | 3/2014 | Sowder | G06Q 40/06 705/35 |
| 2014/0067712 A1* | 3/2014 | Prasad | G06Q 40/06 705/36 R |
| 2014/0095337 A1 | 4/2014 | Pigeon et al. | |
| 2014/0136381 A1* | 5/2014 | Joseph | G06Q 40/02 705/35 |
| 2014/0149249 A1 | 5/2014 | Goad et al. | |
| 2014/0149288 A1 | 5/2014 | Martini et al. | |
| 2014/0164198 A1 | 6/2014 | Caldwell | |
| 2014/0172686 A1 | 6/2014 | Haggerty et al. | |
| 2014/0172700 A1 | 6/2014 | Teuwen et al. | |
| 2014/0173477 A1 | 6/2014 | Wang et al. | |
| 2014/0180962 A1 | 6/2014 | Fiala et al. | |
| 2014/0236789 A1 | 8/2014 | Caldwell | |
| 2014/0249977 A1* | 9/2014 | Kuznetsov | G06Q 40/02 705/35 |
| 2014/0255984 A1 | 9/2014 | Sharpin | |
| 2014/0279302 A1 | 9/2014 | Akin | |
| 2014/0317022 A1 | 10/2014 | Haggerty et al. | |
| 2015/0019427 A1 | 1/2015 | Murphy et al. | |
| 2015/0112821 A1 | 4/2015 | Giacometti | |
| 2015/0135286 A1 | 5/2015 | Egan et al. | |
| 2015/0161674 A1 | 6/2015 | Khoury et al. | |
| 2015/0182130 A1* | 7/2015 | Utter, II | A61B 5/0205 600/483 |
| 2015/0186886 A1 | 7/2015 | Schwalb et al. | |
| 2015/0193868 A1 | 7/2015 | Del Vecchio et al. | |
| 2015/0302464 A1 | 10/2015 | Iannace et al. | |
| 2015/0332264 A1 | 11/2015 | Bondesen et al. | |
| 2016/0005025 A1 | 1/2016 | Zamer | |
| 2016/0034932 A1* | 2/2016 | Sion | G06Q 20/322 705/14.1 |
| 2016/0063235 A1 | 3/2016 | Tussy | |
| 2016/0117765 A1 | 4/2016 | Koeppel et al. | |
| 2016/0180465 A1* | 6/2016 | Deperro | G06Q 40/06 705/36 R |
| 2016/0253702 A1 | 9/2016 | Gonzales, Jr. | |
| 2016/0350848 A1 | 12/2016 | Acharya et al. | |

OTHER PUBLICATIONS

Coin, Inc. Frequently Asked Questions (n.d.) retrieved from the internet at: https://onlycoin.com/support/faq/ on Aug. 11, 2014, 13 pages as printed.

Cole, "Coin aims to replace analog credit cards with a single iPhone-connected accessory", Apple Insider—Online, Nov. 14, 2013, retrieved from the internet at: http://appleinsider.com/articles/13/11/14/coin-aims-to-replace-all-analog-credit-cards-with-a-single-iphone-connected-accessory on Aug. 11, 2014, 2 pages.

Levy, "Coin, The Programmable Credit Card", The Bottom Line, Feb. 5, 2014, retrieved fromt the interent at: http://thebottomline.as.ucsb.edu/2014/02/coin-the-programmable-credit-card on Aug. 11, 2014, 2 pages as printed.

Pepitone, "Digital credit card Coin adds new features after post-launch criticism", CNN Money—Online, Nov. 20, 2013, retrieved from the internet at http://money.cnn.com/2013/11/20/technology/innovation/coin-card-startup/ on Aug. 11, 2014, 2 pages as printed.

Perez, "After a Series of Maintenance Glitches, Bank Simple Rolls Out an Improved, Rebuilt Mobile App", TechCrunch—Online, Aug. 19, 2014, retrieved from the internet at: http://techcrunch.com/2014/08/19/after-a-series-of-maintenance-glitches-bank-simple-rolls-out-an-improved-rebuilt-mobile-app/ on Aug. 19, 2014, 7 pages.

* cited by examiner

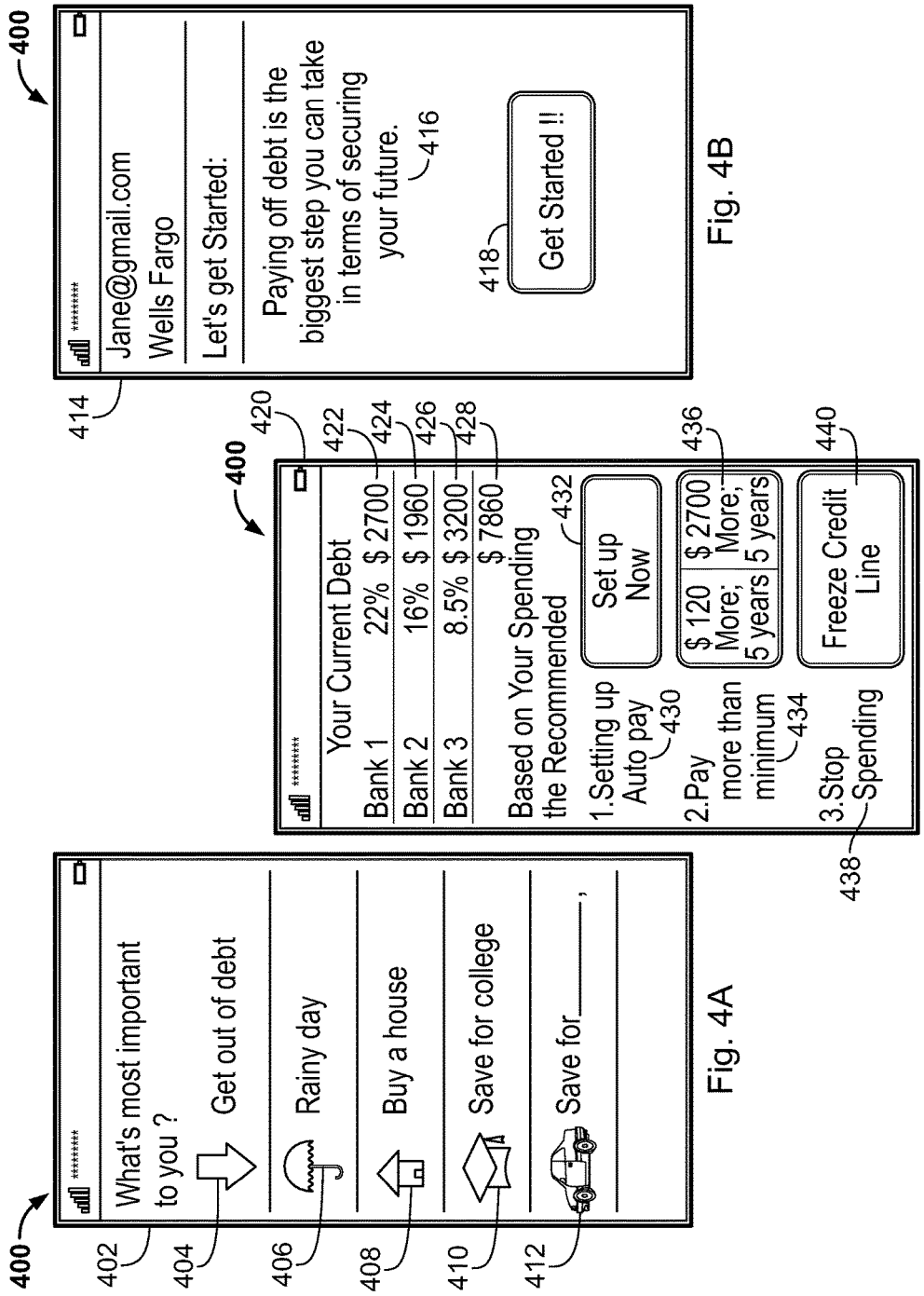

PERSONAL FINANCIAL PLANNING AND ENGAGEMENT WITH PEER-BASED COMPARISON

CROSS-REFERENCE TO RELATED PATENT APPLICATIONS

This application claims priority from Provisional Application 62/036,380, filed Aug. 12, 2014, incorporated herein by reference in its entirety.

BACKGROUND

The present disclosure relates generally to systems and methods of financial planning and, more specifically, to systems and methods for personal financial planning and engagement with peer-based comparison.

Individuals often rely on computer-based systems to manage their personal finances. Conventional personal financial management systems include software and Internet-based systems. Certain systems allow users to create budgets and to track goals. However, many systems are cumbersome and difficult to use. Furthermore, some users may be intimidated by creating budgets and setting goals, and may not know where to start. Other users may tend to create budgets and goals, but may neglect to follow their budgets and track their goals. Thus, there is a need for a simple personal financial planning and engagement system.

A significant and continually growing amount of the population uses social media, such as Facebook® and Twitter®, to communicate and to share content over the Internet. Further, individuals often rely on social media for encouragement and personal validation from their social network. However, personal finance is a topic that is conventionally taboo for public discussion amongst acquaintances. Thus, there is a need for a system that facilitates peer-based personal financial engagement and comparison by sharing anonymized financial information over virtual communities, such as social media.

SUMMARY

One embodiment relates to a computer-implemented method for setting and tracking financial goals includes retrieving account information associated with a financial account of a user. The method also includes providing to the user via a user interface, prospective financial goals. The method further includes receiving from the user via the user interface, a selection of one of the financial goals. Further yet, the method includes monitoring the user's account information to track the user's progress towards the selected financial goal. In addition, the method includes providing to the user via the user interface, based on the monitoring of the user's account information, no more than three suggested actions to improve the user's progress towards the selected financial goal.

Another embodiment relates to a system for setting and tracking financial goals. The system includes a data storage system, and a processor and program logic stored in memory and executed by the processor. The program logic includes account management logic configured to retrieve account information associated with a financial account of a user. The program logic also includes goal logic configured to provide to the user via a user interface, prospective financial goals, and to receive from the user via the user interface, a selection of one of the financial goals. The program logic further includes analysis logic configured to monitor the user's account information to track the user's progress towards the selected financial goal. Further yet, the program logic includes guidance logic configured to provide to the user via the user interface, based on the monitoring of the user's account information, no more than three suggested actions to improve the user's progress towards the selected financial goal.

Another embodiment relates to a computer-implemented method for implementing a virtual financial community. The method includes associating a first user with a financial profile and with a financial goal. The method also includes associating the first user with a virtual community, the virtual community including a plurality of users having similar financial profiles and similar financial goals. The method further includes tracking progress of the plurality of users of the virtual community towards their respective financial goals. Further yet, the method includes providing to the first user a comparison of the first user's progress towards the first user's financial goal relative to the progress of the plurality of users of the virtual community towards their respective financial goals.

Another embodiment relates to a system for implementing a virtual financial community. The system includes a data storage system, and a processor and program logic stored in memory and executed by the processor. The program logic includes goal logic configured to associate a first user with a financial profile and with a financial goal. The program logic also includes a virtual community system configured to associate the first user with a virtual community, the virtual community including a plurality of users having similar financial profiles and similar financial goals. The virtual community system is also configured to track progress of the plurality of users of the virtual community towards their respective financial goals. The virtual community system is further configured to provide to the first user a comparison of the first user's progress towards the first user's financial goal relative to the progress of the plurality of users of the virtual community towards their respective financial goals.

BRIEF DESCRIPTION OF THE DRAWINGS

FIGS. 4A-4E illustrate a user interface for setting and tracking financial goals in accordance with an example embodiment.

DETAILED DESCRIPTION

Figure 1:
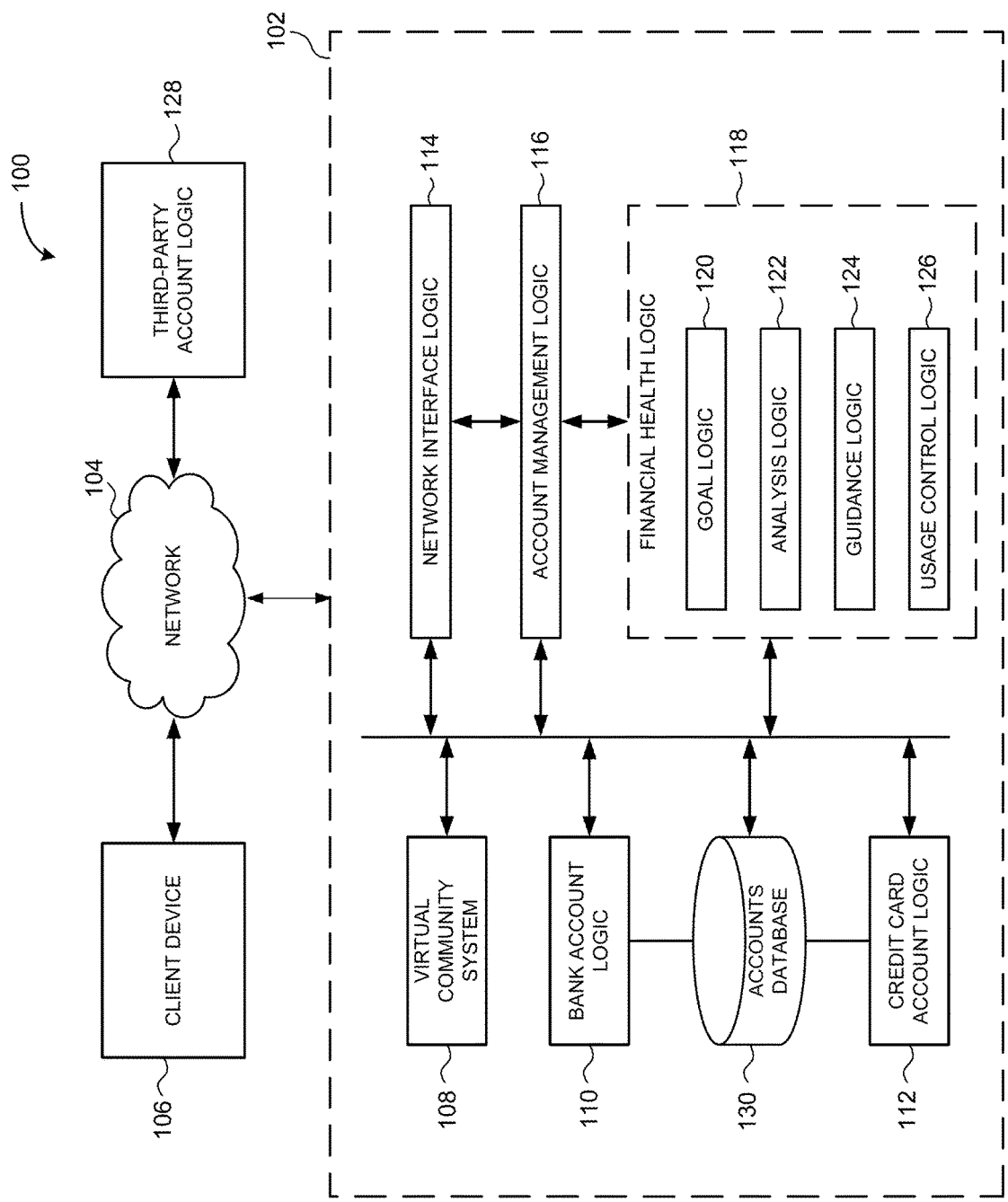
FIG. 1 is a block diagram of a data processing system according to an example embodiment.

FIG. 1 is a block diagram illustrating a data processing system 100 according to an example embodiment. The data processing system 100 includes a financial management system 102 configured to, among other things, manage personal financial accounts at one or more financial institutions. In the example of FIG. 1, the financial management system 102 is implemented by an enterprise computing system of a financial institution at which a user has one or more financial accounts.

The user may access the financial management system 102 via a network 104 (e.g., the Internet or an intranet) using a client device 106 (e.g., a computer or a mobile device) or in another manner. In one embodiment, the user may, for example, access the financial management system 102 through an online banking area of a website or application provided by the bank based on a valid username and password. Upon entering the online banking area of the website or application, the user may be provided with profile information, such as one or more partial bank account numbers of the account or the accounts held by the user at the financial institution providing the financial management system 102.

The financial management system 102 may include, among other systems and logics, a virtual community system 108; bank account logic 110; credit card account logic 112; network interface logic 114; account management logic 116; and financial health logic 118, including goal logic 120, analysis logic 122, guidance logic 124, and usage control logic 126. Such systems and logics, and other systems and logics discussed herein may, in practice, be implemented in a machine (e.g., one or more computers or servers) comprising machine-readable storage media (e.g., cache, memory, internal or external hard drive or in a cloud computing environment) having instructions stored therein which are executed by the machine to perform the operations described herein. For example, the financial management system 102 may include server-based computing systems, for example, comprising one or more networked computer servers that are programmed to perform the operations described herein. In another example, the financial management system 102 may be implemented as a distributed computer system where each function is spread over multiple computer systems.

The virtual community system 108 operates a virtual community of individuals (e.g., a social network). The virtual community may be any Internet destination (e.g., website) where users may obtain user names/login IDs or otherwise become registered members. The individuals may, for example, use the virtual community to interact with each other and/or to interact with a service provided by the virtual community system 108. In some embodiments, the virtual community system 108 implements a local virtual community hosted by the financial management system 102. In some examples, users may obtain non-identifying user names/login IDs for the virtual community that are independent from those used to logon to the online banking area of the website or application. In other embodiments, the virtual community system 108 operates via a third-party online community. For example, various third-party online communities may be accessed via third-party account logic 128. Examples of third-party online communities include Facebook®, Tumblr®, Twitter®, LinkedIn®, Google+®, Instagram®, Snapchat®, Vine®, MSN®, iPhone® users, etc.

Network interface logic 114 may be used to connect the financial management system 102 to the Internet to permit users to access the financial management system 102, for example, through an online banking website or other website, through an application, or in other ways. For example, the network interface logic 114 may comprise one or more computers or web servers that provide a graphical user interface (e.g., a series of dynamically-generated web pages) for users that access the financial management system 102 through the web. The graphical user interface may be used to prompt the user to provide login information, passwords and other authentication information or other stored tokens.

Upon successfully logging in, the graphical user interface may be used to provide the user with account information. The network interface logic 114 may also comprise other logic that is configured to provide an interface for other types of devices such as mobile devices (e.g., cellular phones, smart phones, tablet computers, mobile e-mail devices, etc.), fax machines, ATMs, server-based computing systems, etc. The network interface logic 114 may provide access to an application programming interface (API) for various third party networks such as Mint®, EWise®, Yodlee®, etc., as well as the online communities mentioned above in connection with the virtual community system 108. The network interface logic 114 may also be used to connect to third-party account logic 128 to provide access to users' accounts (e.g., bank accounts, brokerage accounts, credit card accounts, social media accounts, etc.) managed by third-parties that are external to the financial management system 102.

The account management logic 116 may interact with various backend systems in connection with maintaining financial accounts for account owners. For example, the account management logic 116 may manage bank accounts (e.g., checking and savings accounts) via bank account logic 110 and credit card accounts via credit card account logic 112. The bank account logic 110 and credit card account logic 112 may store account information for various users' accounts in one or more accounts databases 130. The account management logic 116 manages each user's accounts by facilitating, among other things, account processing, account records, statement generation, bill pay, funds transfers, etc. Account records include, among other things, records of financial transactions associated with each account. Financial transactions may include, for example, credits or debits to a user's account, such as the purchase of a good or the deposit of a paycheck, and various metadata associated therewith.

In addition to the above, the account management logic 116 provides enhanced functionality to users by utilizing financial health logic 118, which includes goal logic 120, analysis logic 122, and guidance logic 124 and usage control logic 126. As explained in further detail below, the financial health logic 118 is configured to engage users and improve their overall financial health through goal setting and tracking, as well as through virtual community engagement.

Goal logic 120 allows users to create and manage various financial goals. Goal logic 120 is configured to engage users that might not otherwise set and track financial goals. According to various example embodiments, the goal logic 120 receives information from a user in various ways, such as via the account management logic 116, as well as through querying users. For example, in some embodiments, the goal logic 120 queries a user and provides various selectable options. One problem encountered by conventional financial management systems is displaying options that certain users (e.g., novice users) can select to set and track financial goals. According to some embodiments, the goal logic 120 solves this problem by analyzing information about a user (e.g., information received via account management logic 116 and analyzed via analysis logic 122) to determine targeted selectable options that are most relevant to a particular user, and presenting a small number (e.g., five or fewer) of the targeted selectable options to the user. Such analysis provides a number of advantages over conventional systems. An example effect of this technique is that, by presenting fewer selectable options, each option can be presented using larger selectable icons, which makes the options easier for a user to select. This is especially beneficial when the selectable options are displayed on devices with limited screen size (e.g., mobile devices). Another example effect is that a user may be more likely to select certain options if targeted selectable options are presented to the user based on their relevance to the particular user.

According to some example embodiments, the goal logic 120 also solves the problem of engaging users to set and track financial goals by querying users regarding their personal preferences or behavior rather than directly receiving inputs from a user to set a goal. In one example, the goal logic 120 queries a user regarding the user's financial priorities, and provides selectable options (e.g., targeted selectable options) of various prospective financial priorities. In another example, the goal logic 120 queries a user regarding which of a plurality of selectable financial profiles the user most closely identifies to, and provides selectable options (e.g., targeted selectable options) of various example financial profiles. Based on the user's account information, answers to queries, and/or other information, the goal logic 120 assists the user in setting parameters to define the user's financial goals. An example effect of this technique is that, based on such information, the goal logic 120 can provide targeted information that is most relevant to the particular user, thereby avoiding presenting extraneous information that occupies unneeded screen space. Therefore, users are ultimately able to set up various financial goals more easily and more quickly than possible with conventional systems.

According to various example embodiments goal logic 120 allows users to set and track one or more concurrent goals. In addition, in some examples, the goal logic 120 creates sub-accounts within a user's financial (e.g., checking or savings) account for each goal. Thus, money allocated to each goal is displayed to the user as deposited in the respective goal sub-account rather than in the user's main account. By utilizing goal sub-accounts, users may be less likely to spend money that they have previously allocated towards certain goals. Further, the goal logic 120 allows users to contribute money towards goals in various ways. For example, users may contribute money towards goals via an online webpage or application associated with a financial institution, via text messages, and in other ways. In some examples, goal logic 120 allows users to set recurring goal contributions (e.g., $50 every week towards a new car goal).

Goal logic 120 also displays users' progress towards meeting their goals in various ways. In one example, goal logic displays goal progress via graphical indicators, such as images of a thermometer or meter. In some examples, the graphical indicator is filled in or colored in proportion to the user's progress towards the corresponding goal. In some examples, the goal logic 120, via the virtual community logic 108, allows users to share their goal progress with others over various virtual communities or social media platforms. In such examples, users may configure what type of information is shared. For example, certain users may elect to share their goal progress in terms of percentage completion rather than in terms of a dollar amount. In some embodiments, goal logic 120 also provides the ability for other users to contribute to a user's goals. For example, if a user has shared his or her goal progress through a virtual community, one of the user's contacts or "friends" may contribute money to help the user meet his or her goal.

Analysis logic 122 examines users' financial behavior to identify trends, track goal progress, and to perform other types of analysis. For example, in one example embodiment, the analysis logic 122 tracks a user's financial behavior (e.g., spending habits) over time to identify patterns and trends in the user's behavior. The analysis logic 122 may analyze financial behavior based on various factors, such as budget category, merchant, date, time, etc.

In some embodiments, the analysis logic 122 examines users' account information and/or financial behavior to determine certain options (e.g., selectable financial goals, priorities, profiles, etc.) to present to users based on which options are most likely to be relevant to the users. For example, the analysis logic 122 may determine that a user has outstanding student loans. Therefore, the analysis logic 122 (e.g., via the goal logic 120) may display "Pay off student loans" as a selectable prospective goal rather than "Save for college." In some examples, the analysis logic 122 tracks users' behavior (e.g., goal, priority, and/or profile selections; spending habits; etc.) based on various user characteristics (e.g., age, gender, address, annual salary, account balances, spending habits, etc.) and predicts options that are most likely to be relevant to users based on other users' behavior.

Guidance logic 124 provides financial advice, tips, and recommendations to a user to improve his or her financial health. Guidance logic 124 leverages analysis logic 122 to provide individualized guidance based on a user's actual financial behavior. For example, guidance logic 124 may recognize that a user has saved $2 by using coupons and may ask the user if he or she would like to contribute (e.g., via text message) the amount saved towards a goal. In some examples, the guidance logic 124 informs users as to certain actions other users have taken to succeed financially. Furthermore, the guidance logic 124 may periodically provide educational information to inform users about various topics, such as best practices for financial health.

Banking and personal financial management is increasingly conducted online rather than through brick-and-mortar institutions. Because of the lack of personal interaction between customers and financial professionals, users may not have the opportunity to ask questions to financial professionals about their finances. According to various embodiments, the guidance logic 124 facilitates interaction between users and real or virtual financial professionals (e.g., representatives of the financial institution that provides the financial management system 102).

Financial professionals, via the guidance logic 124, may provide suggestions, education, and encouragement to one or more users. In various examples, users may interact with financial professionals via messages (e.g., direct or group text, email, voice, and/or video messages, etc.). For example, the guidance logic 124 (e.g., via the virtual community system 108), may provide a message board on which financial professionals and/or the users may post messages. In certain example embodiments, the guidance logic 124 facilitates interaction between various users (e.g., via the virtual community system 108), such as through the message board and through messages between users. Furthermore, in some examples, the guidance logic 124 provides a secure interface through which users may ask confidential financial questions to financial professionals.

Usage control logic 126 allows users to set various restrictions on their own financial accounts (e.g., credit card accounts or bank accounts) and on financial accounts that the users are authorized to control, such as their children's accounts. Certain users find it difficult to proverbially "balance their checkbook" or, in other words, to keep track of their purchases relative to their financial goals and budgets. The usage control logic 126 is configured to allow authorized users to set, update, and control various parameters to automatically notify users and/or to restrict usage if certain parameters are exceeded. Thus, the usage control logic 126 makes users aware, in near real-time, if certain parameters are exceeded. Therefore, usage control logic 126 enhances financial awareness and helps users to avoid poor financial decisions.

According to an example embodiment, the usage control logic 126 allows users to set both "soft limits" and "hard limits" based on various usage parameters. For example, a soft limit defines certain account activity that, if exceeded, causes the usage control logic 126 to provide a notification to the user. As another example, a hard limit defines certain account activity that, if exceeded, causes the usage control logic 126 to restrict the use of (e.g., freeze) certain account activities. The usage parameters may be set according to predetermined spending limits based on certain transaction categories, merchants, time of use, etc. The usage control logic 126 allows authorized users full control over setting, updating, and/or opting out of various usage restrictions.

According to an example embodiment, the usage control logic 126 provides authorized users the ability to define trusted and prohibited merchants, such that transactions are prohibited or the account is temporarily "frozen" if transactions are attempted at a prohibited merchant. As another example, users can define usage parameters that only allow recurring charges from trusted merchants. In one example, the usage control logic 126 provides a notification to a user if a recurring charge is attempted from a non-trusted merchant, and does not accept the charge until it is approved by the user. In another example, the usage control logic 126 filters ads based on usage parameters. For example, the usage control logic 126 may block ads from prohibited merchants or block ads corresponding to certain transaction categories if budgets for those transaction categories are exceeded. In some embodiments, the usage control logic 126 automatically sets certain usage parameters based on parental controls, such as parental phone usage controls.

Figure 2:
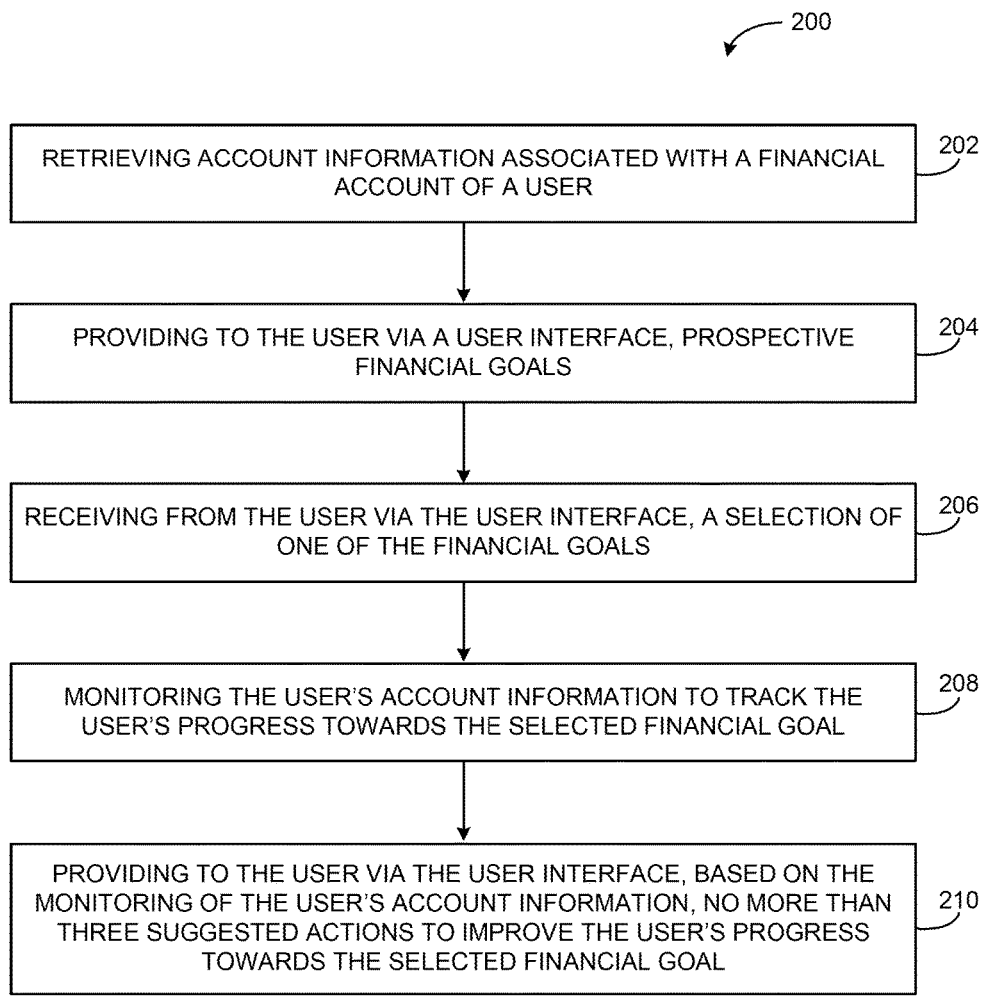
FIG. 2 is a flow diagram of a method of setting and tracking financial goals according to an example embodiment.

Turning now to FIG. 2, a flow diagram of a method 200 of setting and tracking financial goals is illustrated according to an example embodiment. For example, the method 200 may be performed by the data processing system 100 of FIG. 1, utilizing the financial health logic 118, including the goal logic 120, the analysis logic 122, the guidance logic 124, and the usage control logic 126. The method 200 is configured to engage users that might not otherwise set financial goals. For example, certain users may be overwhelmed by the idea of setting up financial goals. Other users may simply not know where to start. Some users may tend to abstain from managing their finances whatsoever if they get into debt (e.g., credit card debt) and may not trust themselves to find a way out of debt. The method 200 is designed to give any user—even those users without prior financial knowledge or experience—the feeling of control over their finances without the anxieties of a complex financial plan. The method 200 achieves this objective by providing no-frill, actionable steps users can take to improve their financial well-being based on their personal financial priorities.

At 202, account information associated with a financial account of a user is retrieved. In some embodiments, the account information is retrieved upon the user logging into an online banking website or an application associated with a financial account (e.g., a bank account and/or credit card account) of a user. The account information may include account balance information associated with one or more bank accounts (e.g., checking and/or savings accounts), credit card accounts, loans (e.g., mortgages, automobile loans, student loans, etc.), bill-pay accounts, and other accounts of the user, which may be stored in the accounts database 130 and/or accessed via the third-party account logic 128. In addition to account balance information, the account information may also include an interest rate, and a minimum monthly payment, etc. relating to each account. The account information may further include payment history information, such as prior payment amounts and minimum payment amounts for the various accounts. In some embodiments, the account information may also include information regarding the user's financial behavior, which may be analyzed by the analysis logic 122 as mentioned above. In addition, the account information may include information relating to the user, such as the user's age, gender, address, annual salary, etc.

At 204, prospective financial goals (e.g., financial priorities) are provided to a user via a user interface. For example, the user interface may include an online banking website or an application associated with a financial account of the user. According to an example embodiment, prospective financial goals may include, for example, "Get out of debt," "Save for a rainy day," "Buy a house," "Save for college," etc. In some examples, the financial health logic 118, including the goal logic 120 and the analysis logic 122, analyzes the user's account information obtained at 202 to provide individualized prospective financial goals based on the user's account usage activity, balances, age, etc. For example, the analysis logic 122 may determine that a user has outstanding student loans. Thus, the prospective financial goals for that user may include "Pay off student loans" rather than "Save for college."

At 206, an input comprising a selection of one of the prospective financial goals is received from the user via the user interface. According to various embodiments, a user can provide an input via, for example, a computer mouse, a keyboard, a touchscreen, and/or a voice command. For example, the user may touch a "Get out of debt" button on a touchscreen device to select the corresponding financial goal. Alternatively, the user may select the same button by clicking the button with a mouse to select the corresponding item.

At 208, the user's account information is monitored to track the user's progress towards the selected financial goal. For example, if the user's selected financial goal is "Get out of debt," the analysis logic 122 may monitor the balances of debts (e.g., credit card balances, student loan balances, etc.) within the one or more of the user's financial accounts from which the account information was received at 202. Over time, the analysis logic 122 monitors the balances of the user's accounts to track the user's goal progress.

At 210, suggested actions to improve the user's progress towards the selected financial goal are provided to the user via the user interface. According to various embodiments, the number of suggested actions that are provided is limited. For example, in one example, no more than three suggested actions are provided. In another example, no more than four suggested actions are provided. In a further example, no more than five suggested actions are provided. Limiting the suggested actions may be particularly beneficial for devices in which screen size is limited (e.g., mobile devices). In some examples, the suggested actions are nested. By providing fewer suggested actions, each one can be displayed using larger icons, which may be more easily viewed and selected by a user. According to an example embodiment, the suggested actions include simple steps that a user can perform to reach his or her financial goals. For example, the suggested actions may include "Setting up autopay," "Paying more than the minimum payment," etc.

According to an example embodiment, one of the suggested actions includes defining parameters to set usage restrictions on one or more of the user's financial accounts. Usage restrictions allow users to implement self-imposed limits to improve their overall financial health without compromising their financial accounts. Because the parameters are self-imposed by the user, freezing their accounts will not result in penalty fees or account closings, so long as limits associated with the account itself (e.g., a credit limit imposed by the issuer) are not exceeded. The parameters may be set and controlled by the user, and used as a tool to help the user adhere to certain spending habits. In one example, the parameters to freeze the user's account include a spending limit, such that the user's account is frozen if the spending limit is exceeded. If the user's account is frozen, the user can simply unfreeze the account through the user interface. In another example, the user can provide a prohibited merchant list such that the user's account is frozen with respect to transactions attempted at merchants included in the prohibited merchant list.

Over time, the user interface may provide notifications regarding the user's progress towards his or her selected goal. For example, one notification may include a congratulatory message for exceeding a first threshold (e.g., 50% progress towards the goal). In some examples, rewards are provided to the user (e.g., via bank rewards, account credits, points, miles, etc.) for reaching certain thresholds. In other examples, notifications may include personalized tips if the user's progress towards his or her selected goal falls below a second threshold. For example, the analysis logic 122 and the guidance logic 124 may identify that regular purchases at a coffee shop are hindering the user's progress towards a goal. Therefore, the guidance logic 124 may provide a tip that suggests that the user's progress towards a goal would improve by a certain amount if the user reduced purchases at the coffee shop.

According to various example embodiments, users may control frequency, content, and other aspects of notifications. For example, users may enable or disable notifications relating to tips, financial education, ads, promotions, etc. In some examples, users may elect to set regular savings reminders in order to be "nagged" about savings. For example, a user may set a reminder for every Friday night at 6:00 pm that states "Are you planning on going out tonight? How about sending an extra $5 towards your goal for a car before you go out. Text YES to transfer $5 from your checking account to your goal account."

Figure 3:
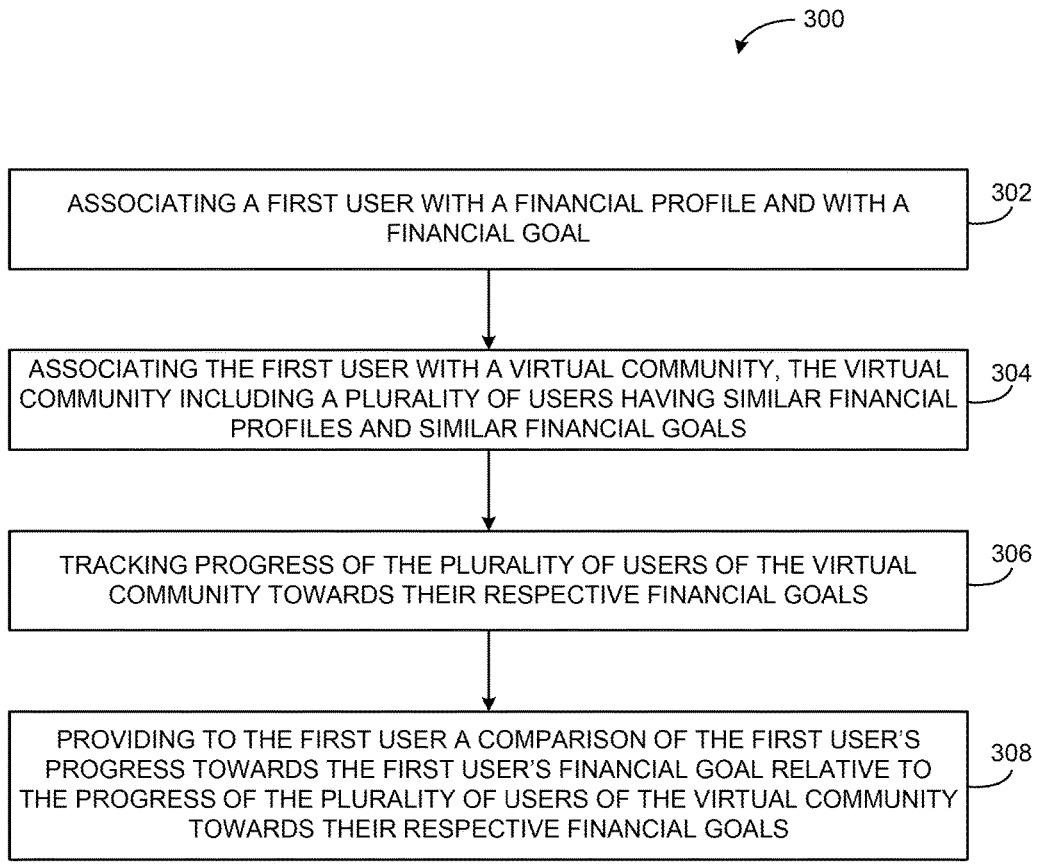
FIG. 3 is a flow diagram of a method of implementing a financial community according to an example embodiment.

Turning now to FIG. 3, a flow diagram of a method 300 of implementing a financial community is illustrated according to an example embodiment. For example, the method 200 may be performed by the data processing system 100 of FIG. 1, utilizing the virtual community system 108, in conjunction with the financial health logic 118, including the goal logic 120, the analysis logic 122, and the guidance logic 124. The method 200 is configured to engage users by providing a virtual community where the users can anonymously compare themselves to other users with similar perspectives and goals in order to learn, gain support, and ultimately succeed financially. The financial community also facilitates friendly competition within and among users and teams of users. In some embodiments, each team includes a coach that can provide financial guidance to the users within the team. According to various examples, users may access the virtual community through an online banking website or an application associated with a financial account of the user.

At 302, a first user is associated with a financial profile and with a financial goal. In some example embodiments, the first user is automatically associated with a financial profile and a financial goal. For example, according to one example embodiment, the online community system 108 (e.g., via the analysis logic 122) analyzes account information associated with one or more connected financial accounts (e.g., a bank account and/or credit card account) of the first user to associate the first user with a financial profile. The online community system 108 may further analyze the first user's usage history (e.g., via the analysis logic 122) to associate the first user with a financial profile. In some embodiments, the first user may have one or more existing financial goals (e.g., via the goal logic 120).

In other examples, the first user is prompted to select a financial profile and a financial goal. For example, the first user may be prompted to select one of a plurality of financial profiles with which the first user most closely identifies. For example, some example financial profiles may include "Stuck," "Impulsive," "Procrastinator," and "Overachiever," among others. The first user may also be prompted to select a financial goal from a plurality of prospective financial goals. In some embodiments, the prospective goals that are presented to the first user are chosen based on the financial profile selected by the first user. For example, a user that selects the "Stuck" financial profile may be presented prospective financial goals including "Pay Off Debt," while a user that selects "Overachiever" may be presented prospective financial goals including "Max Out IRA Contribution."

At 304, the first user is associated with a virtual community. Some example embodiments include a plurality of virtual communities, each including users having particular financial profiles and financial goals. For example, in one example embodiment, the virtual community with which the first user is associated includes a plurality of users having similar financial profiles and similar financial goals as the first user. In some example embodiments, the virtual communities further include users within common geographical areas (e.g., cities, states, regions, countries, etc.).

In some examples, the online community system 108, via the third-party account logic 128, associates users with virtual communities via the users' existing virtual communities over various social media platforms (e.g., Facebook®, Tumblr®, Twitter®, LinkedIn®, Google+®, Instagram®, etc.). In some embodiments, the virtual community is hosted on an existing social media platform (e.g., as a Facebook® group or application). In other embodiments, the virtual community is hosted by the data processing system 100 of FIG. 1. In one embodiment, the online community system 108 connects with a user's existing virtual community via the third-party account logic 128 to receive certain information, such as a list of the user's "friends" or "contacts" within the user's existing virtual community.

At 306, progress of the plurality of users of the virtual community towards their respective financial goals is tracked. For example, the financial health logic 118, including the goal logic 120 and the analysis logic 122 may monitor each of the users' financial activity to track each of the users' progress towards their respective financial goals.

At 308, a comparison of the first user's progress towards his or her financial goal relative to that of the other users of the virtual community is provided to the first user. For example, each user may be provided a graphical indicator, such as an image of a thermometer or a person climbing a mountain, to represent goal progress. In one example embodiment, the comparison is provided as a graphical representation of a ranking of the first user's progress relative to that of the plurality of users of the virtual community.

According to one example, the comparison is anonymized such that no identifying information corresponding to the users of the virtual community is displayed. For example, progress towards a financial goal may be displayed with respect to a percentage completion rather than particular dollar amounts. As another example, the individual users' names may be hidden, or they may receive non-identifying aliases (e.g., usernames and/or avatars).

In some examples, the virtual communities include messaging systems (e.g., messaging boards and/or direct messaging systems) such that users can send and receive messages. For example, users may be able to congratulate or encourage other users. Additionally or alternatively, in some example embodiments, the users may be provided with individually tailored tips or suggestions via the guidance logic based on their financial usage.

Turning to FIGS. 4A-4E, a user interface 400 to set and track financial goals is illustrated according to an example embodiment. For example, the user interface 400 may be displayed on the client device 106 in connection with the data processing system 100 of FIG. 1. As shown in FIGS. 4A-4E, the user interface 400 may be used by a user to set and track financial goals. In some embodiments, the user interface 400 may be configured to perform the method 200 of FIG. 2. The user interface 400 is configured to engage users to set goals and to ultimately improve their financial health. The user interface 400 is simple and user-friendly, such that it may be easily used by users that may not be particularly financially savvy. To achieve this objective, the user interface 400 prompts the user by asking simple questions about the user's personal financial priorities, assists the user in setting financial goals based on the user's selected priorities, and provides recommendations on simple steps the user can take to help achieve his or her goals.

In various embodiments, the user interface 400 may be accessed by a user in numerous ways. In some embodiments, the user interface 400 is accessed by a user through an online account section of a website of a financial institution. For example, the user may be a customer of a bank and the user interface 400 may be accessed by a secure online banking section of the bank's website and/or through an application running on a mobile device, such a mobile telephone or a tablet computer. In such examples, the user would be granted access to that banking section upon providing a username or email address and a password to verify the user's identity. In certain embodiments, the user interface 400 may be accessed upon a user selecting a "Goal," "Financial Priority," or "Financial Health" feature or otherwise entering a "Goal," "Financial Priority," or "Financial Health" section of a website or application.

In some examples, the user interface 400 is accessed across different platforms. For example, in some examples, certain portions (e.g., "screens") of the user interface 400 may be included (e.g., embedded) in a message (e.g., an email, a text message, a notification, etc.) or as an advertisement. Other portions (e.g., screens) of the user interface 400 may be accessed external to the message or advertisement, such as via a website or an application.

FIG. 4A illustrates a first screen 402 of the user interface 400. Upon accessing the user interface 400, the data processing system 100 (e.g., via the account management logic 116) receives account information associated with one or more financial accounts of the user. According to one example, the first screen 402 includes a question regarding a user's financial priorities (e.g., prospective financial goals) and a plurality of selectable options. For example, the first screen 402 prompts the user by asking "What's most important to you?" The first screen 402 includes first, second, third, fourth, and fifth selectable options 404, 406, 408, 410, 412 that can be selected by the user in response to the question. For example, the first selectable option 404 is "Get out of debt," the second selectable option 406 is "Rainy day," the third selectable option 408 is "Buy a house," the fourth selectable option 410 is "Save for college," and the fifth selectable option 412 is "Save for _____."

In some examples, selectable options, such as the first, second, third, fourth, and fifth selectable options 404, 406, 408, 410, 412 that are displayed on the first screen 402 are predetermined. For example, the selectable options may be the most commonly selected financial priorities or prospective financial goals. In other examples, the selectable options are not predetermined, but are chosen based on the user's account information, personal information, financial activity, and/or based on other information. In such examples, the selectable options that are presented to the user may be personalized such that they are the options predicted to be most relevant to the user. For example, the analysis logic 122 may determine that a user has outstanding student loans. Thus, the selectable options for that user may include "Pay off student loans" rather than "Save for college." As another example, the analysis logic 122 may determine that the user typically takes a two-week vacation abroad every August. Thus, the selectable options for that user may include "Save for vacation." As another example, the analysis logic 122 may determine that the user has outstanding credit card debt. Thus, the selectable options for that user may include "Pay off credit cards." However, not every user has credit card debt. Therefore, the selectable options for users without credit cards may include other selectable options in lieu of "Pay off credit cards."

FIG. 4B illustrates a second screen 414 of the user interface 400. According to an example embodiment, the second screen 414 is accessed upon the user selecting one of the first, second, third, fourth, and fifth selectable options 404, 406, 408, 410, 412 of FIG. 4A. In one example, the second screen 414 is displayed in the same platform (e.g., webpage or application) as the first screen 402, immediately upon the user selecting one of the selectable options. In another example, the second screen 414 is displayed in a different platform than the first screen 402. For example, according to an example embodiment, the second screen 414 is provided as an email to the user.

The second screen 414 includes a message 416 and a button 418. According to the example embodiment illustrated in FIG. 4B, the second screen 414 is provided to the user as an email. In other example embodiments, the second screen 414 may be provided as an interstitial page. The message 416 may include a short statement about the selectable option that the user selected from the first screen 402. In the example embodiment illustrated in FIG. 4B, the user selected the first selectable option 404, "Get out of debt" from the first screen 402 of FIG. 4A. Accordingly, the message 416 on the second screen 414 of FIG. 4B states "Paying off debt is the biggest step you can take in terms of securing your future." The button 418 states "Get Started!!!." As explained in further detail below, upon selecting the button 418, the user is directed to another screen to define various goal parameters.

FIG. 4C illustrates a third screen 420 of the user interface 400. According to an example embodiment, the third screen 420 is accessed upon the user selecting the button 418 of FIG. 4B. According to various embodiments, the third screen 420 can be displayed in the same platform or in a different platform than the second screen 414. For example, in one example embodiment, the second screen 414 is provided in an email message and the third screen 420 is provided on a webpage.

The third screen 420 includes various goal parameters for defining a financial goal, and various suggested actions that the user can select to improve their progress towards the financial goal. In an example embodiment as illustrated in FIG. 4C, the third screen 420 includes first, second, and third debts 422, 424, 426. In one example, the first, second, and third debts 422, 424, 426 are automatically determined by the account management logic 116 based on the user's financial accounts. For example, the account management logic 116 may determine that each of the first, second, and third debts 422, 424, 426 corresponds to a credit card, a loan, or other types of debts. Additionally or alternatively, the first, second, and third debts 422, 424, 426 may be manually inputted by the user. Each of the first, second, and third debts 422, 424, 426 define various goal parameters relating to each respective debt. For example, each of the debts has three columns listing the debtor, the interest rate, and the balance. The first debt 422 is to Bank 1, at an interest rate of 22%, with a balance of $2,700. The second debt is to Bank 2, at an interest rate of 16%, with a balance of $1,960. The third debt is to Bank 3, at an interest rate of 8.5%, with a balance of $3,200. For example, the first and second debts 422, 424 may correspond to credit card debts, while the third debt 426 may correspond to an automobile loan. The third screen 420 also includes a total debt 428, which is the sum of the first, second, and third debts 422, 424, 426.

The third screen 420 also includes various suggested actions that the user can select to improve their progress towards the financial goal. Each suggested action includes one or more selectable buttons for implementing the action. In one example, the suggested actions apply to a selected one of the first, second, and third debts 422, 424, 426. For example, according to the example embodiment illustrated in FIG. 4C, the third screen 420 includes a first suggested action 430 for "Setting up autopay," and a corresponding first action button 432 that is labeled "Set up now." Therefore, if the user selects the first debt 422 and subsequently selects the first action button 432, the user will be routed to another page where he or she may set up automatic payments for the first debt 422.

The third screen 420 also includes a second suggested action 434 for "Pay more than minimum payment," and corresponding second action buttons 436 that are labeled "$120 more; 5 years," and "$200 more; 2 years." According to one embodiment, the second action buttons 436 are dynamically updated based on a selected one of the first, second, and third debts 422, 424, 426. For example, the second buttons 436 include suggested payments above the minimum payment for the selected debt. The goal logic 120, the analysis logic 122, and/or the guidance logic 124 analyzes the selected debt to determine the minimum payment and, based on the minimum payment, determines suggested payments above the minimum payment, as well as corresponding dates at which the selected debt will be paid off based on the respective suggested payments.

The third screen 420 further includes a third suggested action 438 for "Stop spending," and a corresponding third action button 440 that is labeled "Freeze credit line." As mentioned above, the usage control logic 126 allows users to set various restrictions on their own financial accounts (e.g., credit card accounts or bank accounts) and on financial accounts that the users are authorized to control, such as their children's accounts. Upon selecting the third action button 440, the user is able to set various parameters, such as spending limits, trusted and prohibited merchant lists, etc. to set restrictions on one or more of the user's financial accounts.

Figure 4D:
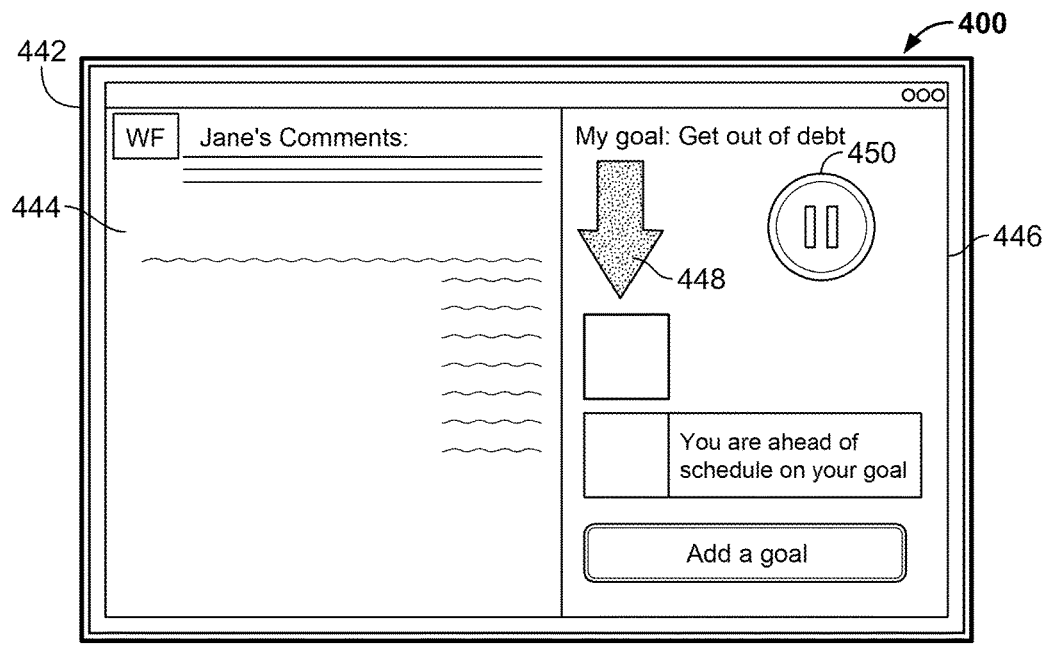

FIG. 4D illustrates a fourth screen 442 of the user interface 400. According to example embodiments, the fourth screen 442 includes an account listing 444 and a goal summary 446. For example, the account listing 444 can include all of the user's financial accounts. In an example, the goal summary 446 automatically updates based on an account selected in the account listing, and based upon financial goals associated with the selected account. The goal summary 446 includes a graphical indicator 448 corresponding to a goal. The graphical indicator 448 may be filled in or colored in proportion to the user's progress towards the corresponding goal.

The goal summary 446 further includes a pause button 450 to pause the corresponding goal. From time to time, users may experience unexpected life events that prevent the users from allocating money towards their financial goals. Therefore, the pause button 450 allows users to temporarily suspend goal tracking and to resume tracking at a later time.

Figure 4E:
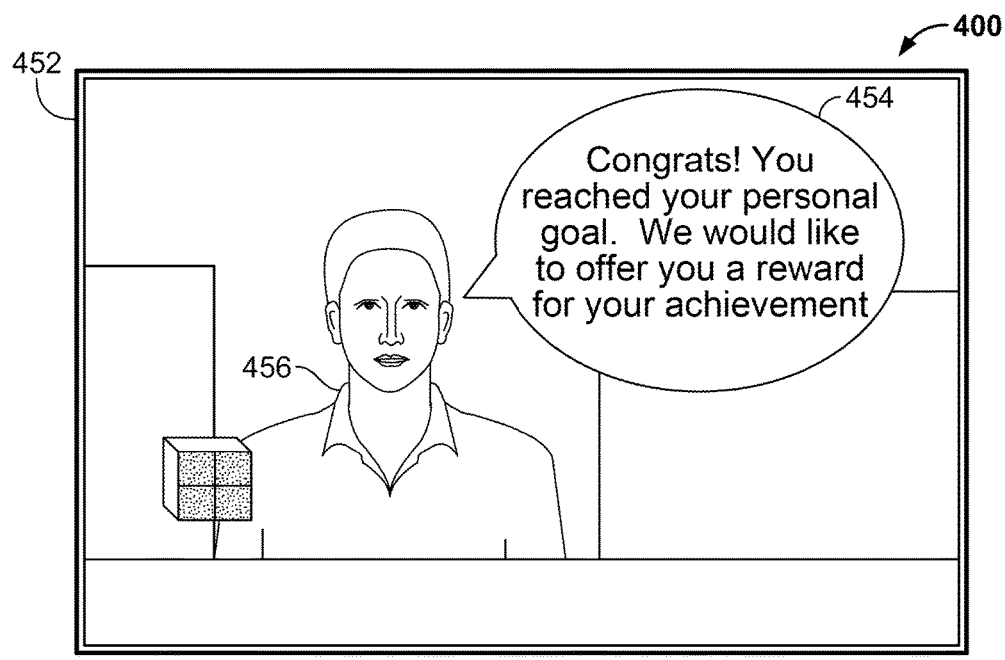

FIG. 4E illustrates a fifth screen 452 of the user interface 400. According to an example embodiment, the fifth screen 452 is a notification that is provided to a user based on the user's progress towards one or more financial goals. The notification may include a message 454 from a "virtual teller" 456. According to various embodiments, the notification can be triggered by either positive or negative goal progress. In an example, a first notification may be provided to the user if the user's progress towards a goal exceeds a first threshold. For example, the first threshold may comprise 50% progress towards meeting a goal, such that a first notification is provided if the user reaches halfway towards meeting the goal. In another example, a second notification is provided to the user if the user's progress towards a goal falls below a second threshold. For example, a second threshold may comprise a 20% reduction in progress towards meeting a goal, such that a second notification is provided if the user's progress towards a goal drops by 20%. The first notification may include recognition and encouragement, while the second notification may include recommendations on changes that the user can make to his or her financial behavior to improve his or her goal progress. In some embodiments, the first notification may further include rewards (e.g., cash back, points, miles, etc.). In various embodiments, the rewards points are issued by the financial institution (e.g., a bank) at which the user has a financial account and/or by other entities, such as entities connected through the third-party account logic 128.

Turning to FIGS. 5A-5F, a user interface 500 is illustrated according to an example embodiment. For example, the user interface 500 may be displayed on the client device 106 in connection with the data processing system 100 of FIG. 1. As shown in FIGS. 5A-5F, the user interface 500 may be used by a user to participate in a virtual financial community. In some embodiments, the user interface 500 may be configured to perform the method 300 of FIG. 3. The user interface 500 is configured to engage users by providing a virtual financial community where the users can anonymously compare themselves to other users with similar perspectives and goals in order to learn, gain support, and ultimately succeed financially. The user interface 500 is simple and user-friendly, such that it may be easily used by users that may not be particularly financially savvy. According to various embodiments, users may access the virtual community through an online banking website or an application associated with a financial account of a user, or through third-party social networks, among other ways.

Figure 5A:
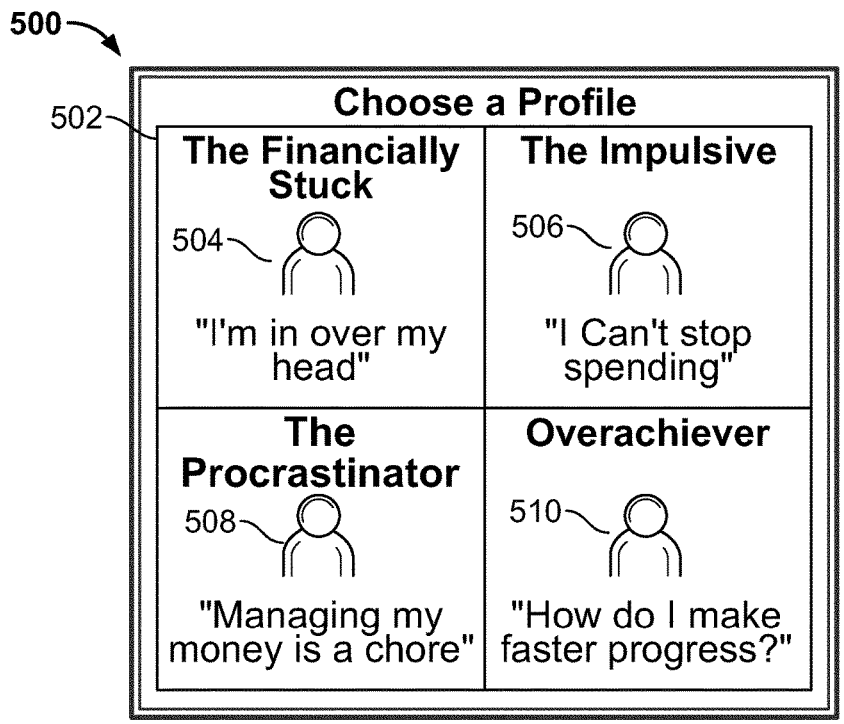
FIGS. 5A-5F illustrate a user interface for participating in a virtual financial community according to an example embodiment.

FIG. 5A illustrates a first screen 502 of the user interface 500. Upon accessing the user interface 500, the data processing system 100 (e.g., via the account management logic 116) receives account information associated with one or more financial accounts of the user. According to an example embodiment, the first screen 502 includes a question regarding a user's financial profile and a plurality of selectable profiles. For example, the first screen 502 prompts the user by stating "Choose a Profile" The first screen 502 includes first, second, third, and fourth selectable financial profiles 504, 506, 508, 510 that can be selected by the user based on the profile to which the user most closely identifies. For example, the first selectable option 504 is "The Financially Stuck," that includes a tagline stating "I'm in over my head." The second selectable financial profile 506 is "The Impulsive," that includes a tagline stating "I can't stop spending." The third selectable financial profile 508 is "The Procrastinator," that includes a tagline stating "Managing my money is a chore." The fourth selectable financial profile 510 is "Overachiever," that includes a tagline stating "How do I make faster progress?"

In some example embodiments, selectable options, such as the first, second, third, and fourth selectable financial profiles 504, 506, 508, 510 that are displayed on the first screen 502 are predetermined. For example, the selectable options may be the most commonly selected financial priorities or prospective financial goals. In other example embodiments, the selectable options are not predetermined, but are chosen based on the user's account information, personal information, financial activity, and/or based on other information. In such embodiments, the selectable options that are presented to the user are personalized such that they are the options predicted to be most relevant to the user. The first, second, third, and fourth selectable financial profiles 504, 506, 508, 510 illustrated in FIG. 5A are merely non-limiting examples of associating a user with a financial profile. Other examples include other example financial profiles.

Figure 5B:
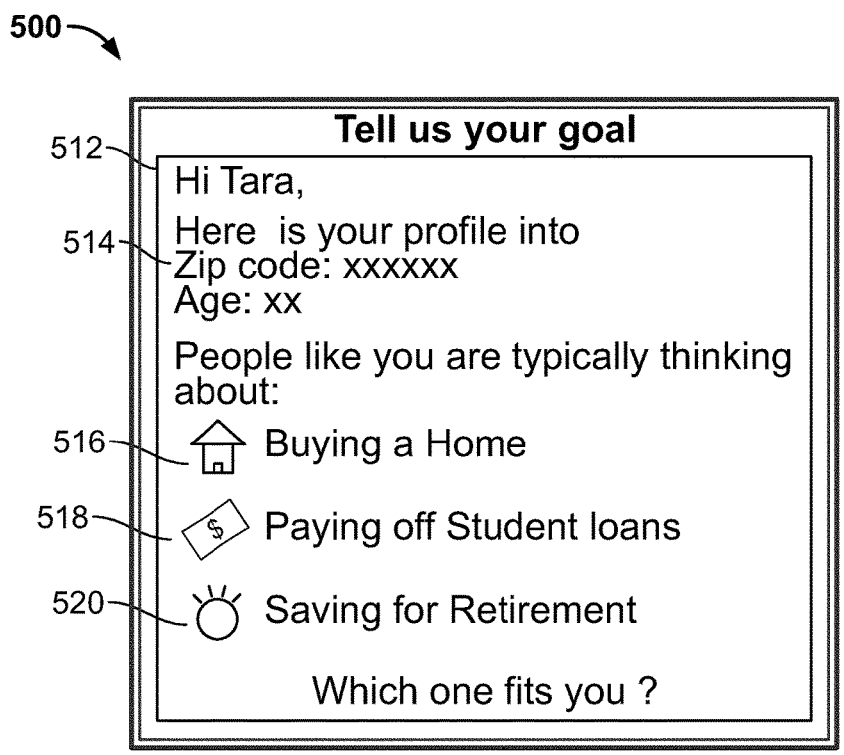

FIG. 5B illustrates a second screen 512 of the user interface 500. According to an example embodiment, the second screen 512 is accessed upon the user selecting one of the first, second, third, and fourth selectable financial profiles 504, 506, 508, 510 of FIG. 5A. The second screen 512 displays the user's financial profile information 514, which may include information relating to the financial profile that the user selected on the first screen 502 of FIG. 5A. Additionally or alternatively, the financial profile information 514 may include account information associated with one or more financial accounts of the user, as accessed via the account management logic 116. For example, the financial profile information 514 includes the user's zip code and age, which may be included in the user's account information.

The second screen 512 of FIG. 5B also includes selectable financial goals (e.g., financial priorities). In particular, FIG. 5B states "People like you are typically thinking about:" and includes first, second, and third financial goals 516, 518, 520. The first financial goal 516 is "Buying a home," the second financial goal 518 is "Paying off student loans," and the third financial goal 520 is "Saving for retirement." The second screen 512 prompts the user to select one of the first, second, and third financial goals 516, 518, 520 by stating "Which one fits you?" In some example embodiments, the first, second, and third financial goals 516, 518, 520 are selected based on at least one of the financial profiles that the user selected on the first screen 502 of FIG. 5A, and the user's financial profile information 514, among other things. For example, the first, second, and third financial goals 516, 518, 520 are determined to be those financial goals that are most likely to be relevant to the user based on the user's selected financial profile and/or financial profile information, among other things.

The options presented to the user on the first and second screens 502, 512 of FIGS. 5A and 5B, respectively, are crafted to be relatable and non-intimidating to users. For example, according to one example embodiment, instead of bluntly asking a user to set up a financial goal, the user is asked to identify himself or herself with various financial profiles and with financial goals or priorities that other similar users may be likely to have. Therefore, users may be more comfortable choosing financial profiles and goals if they know that there are other people with similar financial goals and priorities.

Figure 5C:
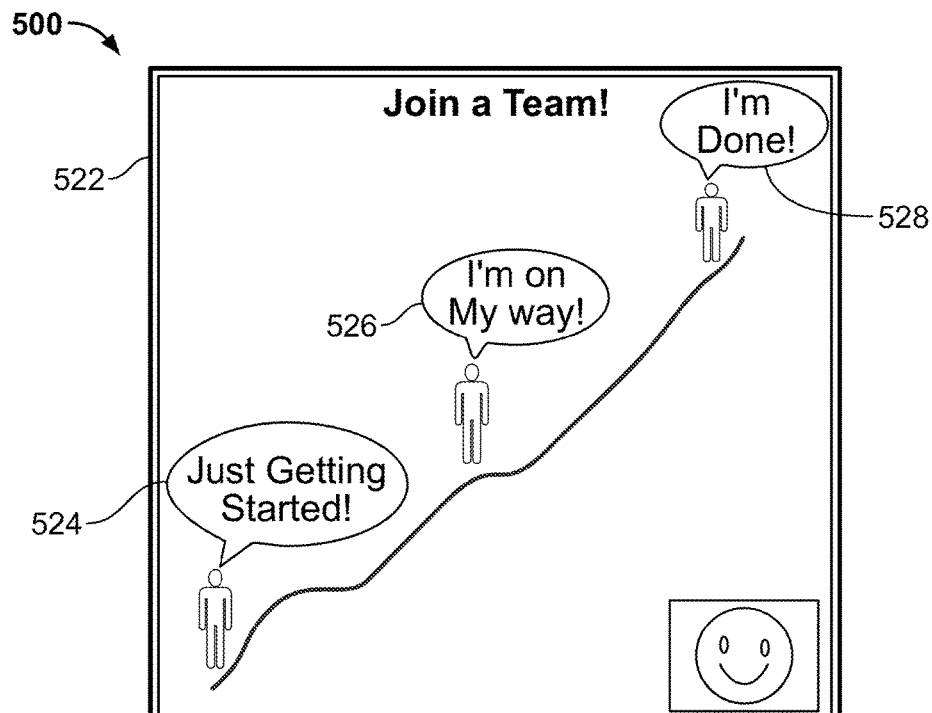

FIG. 5C illustrates a third screen 522 of the user interface 500. According to an example embodiment, the third screen 512 is accessed upon the user selecting one of the first, second, and third financial goals 516, 518, 520 of FIG. 5B. The third screen 522 includes first, second, and third goal progress indicators 524, 526, 528. As shown in FIG. 5C, each of the first, second, and third goal progress indicators 524, 526, 528 are represented as people in different positions on a mountain. For example, the first goal progress indicator 524 includes a first person at the bottom of the mountain with the caption "Just getting Started!" The second goal progress indicator 524 includes a second person in the middle of the mountain with the caption "I'm on my way!" The third goal progress indicator 524 includes a third person at the top of the mountain with the caption "I'm done!" The third screen 522 also includes the caption "Join a Team!" such that a user can select one of the first, second, and third goal progress indicators 524, 526, 528 to join a team including other users that are at similar points in progress towards meeting their goals. In some examples, each team is "coached" by a professional representative of the organization (e.g., financial institution) that provides the financial management system 102 and/or the online community system 108.

Figure 5D:
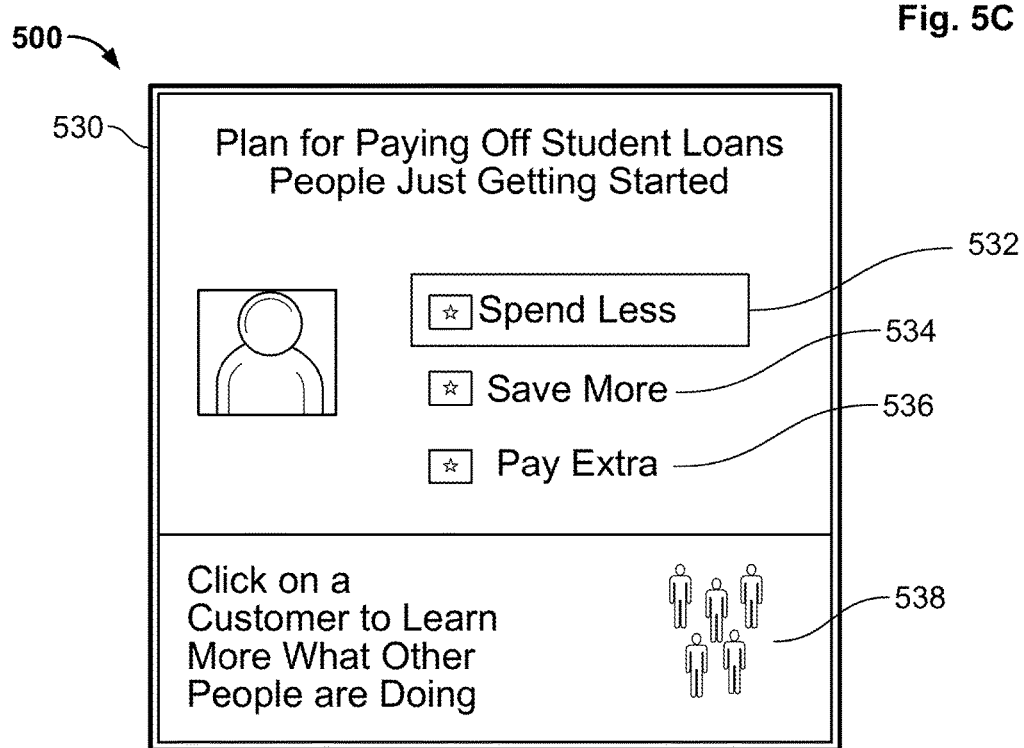

FIG. 5D illustrates a fourth screen 530 of the user interface 500. According to an example embodiment, the fourth screen 530 is accessed upon the user selecting one of the first, second, and third goal progress indicators 524, 526, 528 of FIG. 5C. The fourth screen 530 as illustrated in FIG. 5D is based on the user selecting the first goal progress indicator 524 of FIG. 5C. The fourth screen 530 states "Plan for paying off student loans for people just getting started," and includes first, second, and third suggested actions 532, 534, 536 for the user to improve his or her progress towards his or her selected goal. The fourth screen 530 further includes images of other people 538 and states "Click on a customer to learn more about what other people are doing." Upon the user selecting one of the first, second, and third suggested actions 532, 534, 536, the user may select various people 538 to receive tips or suggestions regarding various ways in which other people perform the selected suggested action. For example, if the user selects the first suggested action 532, "Spend less," the user may select various ones of the people 538 to learn how other people are able to spend less.

Figure 5E:
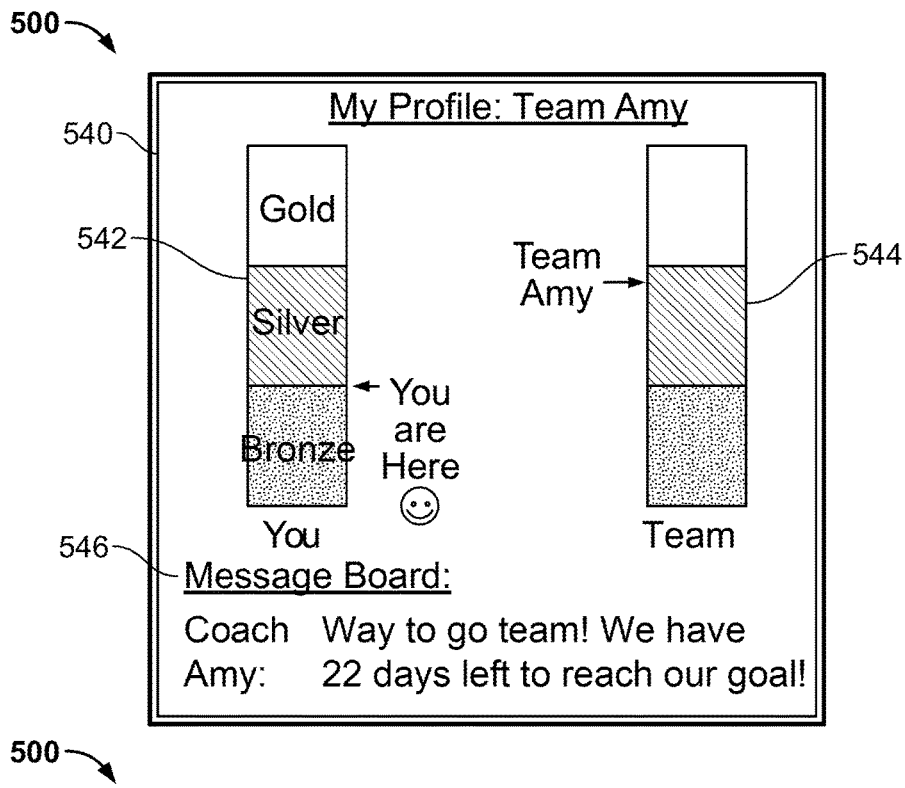

FIG. 5E illustrates a fifth screen 540 of the user interface 500. The fifth screen 540 includes a personal progress indicator 542 and a team progress indicator 544. The personal progress indicator provides a visual representation of the user's progress towards his or her selected goal relative to the user's team. In one example, the goal logic 120 tracks the user's progress towards the user's selected financial goal, as well as the progress of other users towards their respective financial goals, over time. Because the various users' goals may have different amounts, progress is displayed in relative terms (e.g., based on percentage completion). Presenting progress in relative terms also anonymizes the information, such that users do not receive any personal information about other users, nor are users influenced (e.g., encouraged or discouraged) based on their goal amounts relative to others' goal amounts.

The team progress indicator 544 provides a visual representation of the user's team relative to other teams. By providing competition between different teams, members within each team may be more likely to encourage and interact with members of their team so that their team performs well as a whole. Thus, friendly competition increases social interaction and information sharing within the virtual community.

The fifth screen 540 also includes a message board 546. The coach of the team, as well as the team members, can post messages to the team to provide encouragement, suggestions, and feedback, among other things.

Figure 5F:
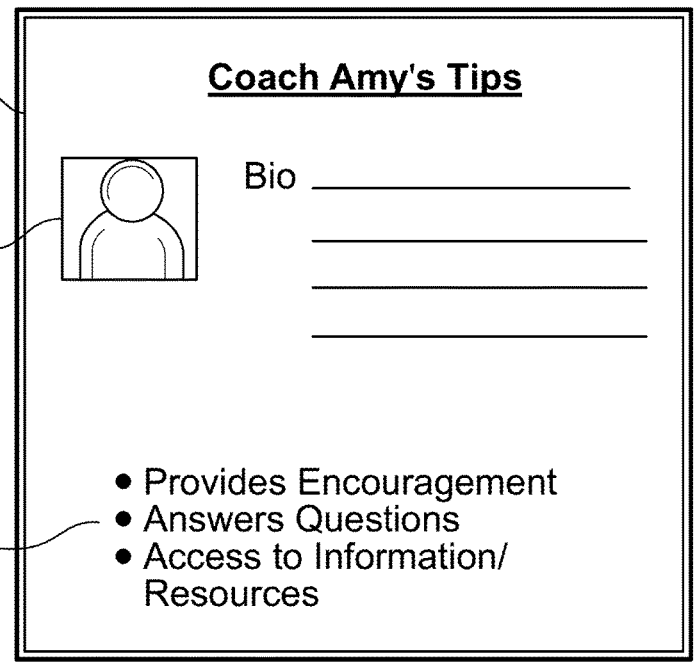

FIG. 5F illustrates a sixth screen 548 of the user interface 500. The sixth screen 548 includes a profile 550 of the team's coach, including the coach's biography, as well as various information 552 that the coach can post for the team members to view. For example, the information 552 may include encouragement, answers to frequently asked questions, as well as access to helpful information and resources.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing system in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented method, comprising:
    retrieving account information associated with a financial account of a user;
    determining, based on the account information, prospective financial goals that are most relevant to the user;
    providing to the user via a user interface, the prospective financial goals;
    receiving from the user via the user interface, a selection of one of the financial goals;
    associating the user with a virtual community, the virtual community including a plurality of users having similar financial profiles and similar financial goals;
    monitoring the user's account information to track the user's progress towards the selected financial goal;
    tracking progress of the plurality of users of the virtual community towards their respective financial goals;
    providing to the user via the user interface a comparison of the user's progress towards the user's financial goal relative to the progress of the plurality of users of the virtual community towards their respective financial goals;
    providing to the user via the user interface, based on the monitoring of the user's account information, no more than three suggested actions to improve the user's progress towards the selected financial goal, wherein at least one of the suggested actions includes defining usage parameters for each of a soft limit and a hard limit;
    providing a notification to the user in response to a soft limit being triggered; and
    restricting use of the financial account in response to a hard limit being triggered.

2. The computer-implemented method of claim 1, further comprising receiving from the user via the user interface, goal parameters to define terms of the selected financial goal.

3. The computer-implemented method of claim 1, wherein at least one of the suggested actions includes setting up auto-pay on the financial account.

4. The computer-implemented method of claim 1, wherein at least one of the suggested actions includes increasing a minimum payment.

5. The computer-implemented method of claim 1, wherein the usage parameters include a predetermined spending limit, wherein any of a hard and a soft limit of the predetermined spending limit is triggered if an amount spent exceeds the predetermined spending limit.

6. The computer-implemented method of claim 1, wherein the usage parameters include a prohibited merchant list, wherein any of a hard and a soft limit of the prohibited merchant list is triggered if a transaction is attempted at a merchant included in the prohibited merchant list.

7. The computer-implemented method of claim 6, further comprising blocking ads from merchants included in the prohibited merchant list.

8. The computer-implemented method of claim 1, further comprising receiving from the user via the user interface, an input to remove the restriction from the financial account.

9. The computer-implemented method of claim 1, further comprising:
    providing to the user via the user interface, a first notification if the user's progress towards the selected financial goal exceeds a first threshold; and
    providing to the user via the user interface, a second notification if the user's progress towards the selected financial goal falls below a second threshold.

10. The computer-implemented method of claim 9, wherein the first notification includes a recognition indicator, and wherein the second notification includes a personalized recommendation to improve the user's progress towards the selected financial goal.

11. The computer-implemented method of claim 9, further comprising providing to the user via the user interface, a reward associated with the financial account if the user's progress towards the selected financial goal exceeds the first threshold.

12. The computer-implemented method of claim 1, wherein the prospective financial goals are provided to the user based on the user's account information.

13. The computer-implemented method of claim 1, further comprising:
    providing to the user via the user interface, a plurality of financial profiles; and
    receiving from the user via the user interface, a selection of one of the financial profiles,
    wherein the prospective financial goals are provided to the user based on the user's selection of one of the financial profiles.

14. The computer-implemented method of claim 1, further comprising:
    receiving from the user via the user interface, an input to pause the selected financial goal; and ceasing to monitor the user's account information to track the user's progress towards the selected financial goal while the selected financial goal is paused.

15. A system for setting and tracking financial goals, the system comprising:
a data storage system;
and a processor and program logic stored in memory and executed by the processor, the program logic including:
account management logic configured to retrieve account information associated with a financial account of a user;
goal logic configured to:
determine, based on the account information, prospective financial goals that are most relevant to the user;
provide to the user via a user interface, the prospective financial goals, and
receive from the user via the user interface, a selection of one of the financial goals, and
associate the user with a virtual community, the virtual community including a plurality of users having similar financial profiles and similar financial goals;
analysis logic configured to:
monitor the user's account information to track the user's progress towards the selected financial goal, and
track progress of the plurality of users of the virtual community towards their respective financial goals;
guidance logic configured to provide to the user via the user interface, based on the monitoring of the user's account information:
a comparison of the user's progress towards the user's financial goal relative to the progress of the plurality of users of the virtual community towards their respective financial goals, and
no more than three suggested actions to improve the user's progress towards the selected financial goal, wherein at least one of the suggested actions includes defining usage parameters for each of a soft limit and a hard limit; and
usage control logic configured to:
provide a notification to the user if a soft limit is triggered; and
restrict use of the financial account if a hard limit is triggered.

16. The system of claim 15, wherein the goal logic is further configured to receive from the user via the user interface, goal parameters to define terms of the selected financial goal.

17. The system of claim 15, wherein at least one of the suggested actions includes setting up auto-pay on the financial account.

18. The system of claim 15, wherein at least one of the suggested actions includes increasing a minimum payment.

19. The system of claim 15, wherein the usage parameters include a predetermined spending limit, wherein any of a hard and a soft limit of the predetermined spending limit is triggered if an amount spent exceeds the predetermined spending limit.

20. The system of claim 15, wherein the usage parameters include a prohibited merchant list, wherein any of a hard and a soft limit of the prohibited merchant list is triggered if a transaction is attempted at a merchant included in the prohibited merchant list.

21. The system of claim 20, wherein the usage control logic is further configured to block ads from merchants included in the prohibited merchant list.

22. The system of claim 15, wherein the usage control logic is further configured to receive from the user via the user interface, an input to remove the restriction from the financial account.

23. The system of claim 15, wherein the guidance logic is further configured to:
provide to the user via the user interface, a first notification if the user's progress towards the selected financial goal exceeds a first threshold; and
provide to the user via the user interface, a second notification if the user's progress towards the selected financial goal falls below a second threshold.

24. The system of claim 23, wherein the first notification includes a recognition indicator, and wherein the second notification includes a personalized recommendation to improve the user's progress towards the selected financial goal.

25. The system of claim 23, wherein the guidance logic is further configured to provide to the user via the user interface, a reward associated with the financial account if the user's progress towards the selected financial goal exceeds the first threshold.

26. The system of claim 15, wherein the prospective financial goals are provided to the user based on the user's account information.

27. The system of claim 15, wherein the goal logic is further configured to:
provide to the user via the user interface, a plurality of financial profiles; and
receive from the user via the user interface, a selection of one of the financial profiles,
wherein the prospective financial goals are provided to the user based on the user's selection of one of the financial profiles.

28. The system of claim 15,
wherein the goal logic is further configured to receive from the user via the user interface, an input to pause the selected financial goal; and
wherein the analysis logic is further configured to cease to monitor the user's account information to track the user's progress towards the selected financial goal while the selected financial goal is paused.

29. The computer-implemented method of claim 1, wherein the user interface is provided via a mobile device.

30. The computer-implemented method of claim 1, wherein the notification is provided to the user via a user interface on a mobile device, in real-time in response to the soft limit being triggered.

31. The computer-implemented method of claim 1, wherein use of the financial account is restricted in real-time in response to the hard limit being triggered.

32. The system of claim 15, wherein the user interface is provided via a mobile device.

33. The system of claim 15, wherein the notification is provided to the user via a user interface on a mobile device, in real-time in response to the soft limit being triggered.

34. The system of claim 15, wherein use of the financial account is restricted in real-time in response to the hard limit being triggered.

* * * * *